(12) United States Patent
Cole et al.

(10) Patent No.: US 6,446,778 B1
(45) Date of Patent: Sep. 10, 2002

(54) RELEASE ASSEMBLY FOR USE WITH A FRICTION CLUTCH

(75) Inventors: Christopher D. Cole, Fort Wayne; Gene L. Graves, Pleasant Lake, both of IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/823,559

(22) Filed: Mar. 31, 2001

(51) Int. Cl.[7] .............................................. F16D 23/14
(52) U.S. Cl. .................... 192/98; 192/99 S; 192/110 B
(58) Field of Search ................. 192/98, 99 S, 192/110 B

(56) References Cited

U.S. PATENT DOCUMENTS

| | | | | |
|---|---|---|---|---|
| 4,506,774 A | * | 3/1985 | Block ........................... | 192/98 |
| 5,009,300 A | * | 4/1991 | Romig ......................... | 192/98 |
| 5,295,566 A | | 3/1994 | Feigler et al. ................. | 192/98 |
| 5,566,804 A | | 10/1996 | Gochenour et al. ...... | 192/70.25 |
| 5,653,323 A | * | 8/1997 | Rappaport .................... | 192/98 |
| 5,911,296 A | | 6/1999 | Cole et al. ............... | 192/70.29 |
| 5,927,454 A | | 7/1999 | Campbell et al. .......... | 192/13 R |
| 5,947,251 A | * | 9/1999 | Goins ....................... | 192/89.26 |
| 6,311,818 B1 | * | 11/2001 | Cole et al. | |

* cited by examiner

Primary Examiner—Christopher P. Schwartz
Assistant Examiner—Mariano Sy
(74) Attorney, Agent, or Firm—Kevin M. Hinman

(57) ABSTRACT

A clutch release assembly for use in a motor vehicle includes a bearing and a housing retaining the bearing. The housing has disposed on its exterior two L-shaped lugs are formed on opposite sides of the housing and extending radially therefrom. The lugs each define a circumferential engagement surface in a plane normal to the axis and face toward the bearing. An axially extending engagement surface is normal to the circumferential engagement surface wherein the tips of the arms of a clutch yoke engage the circumferential engagement surface to axially displace the release assembly. The axially extending surfaces prevent rotation of the housing by engagement with the tips of the arms.

5 Claims, 5 Drawing Sheets

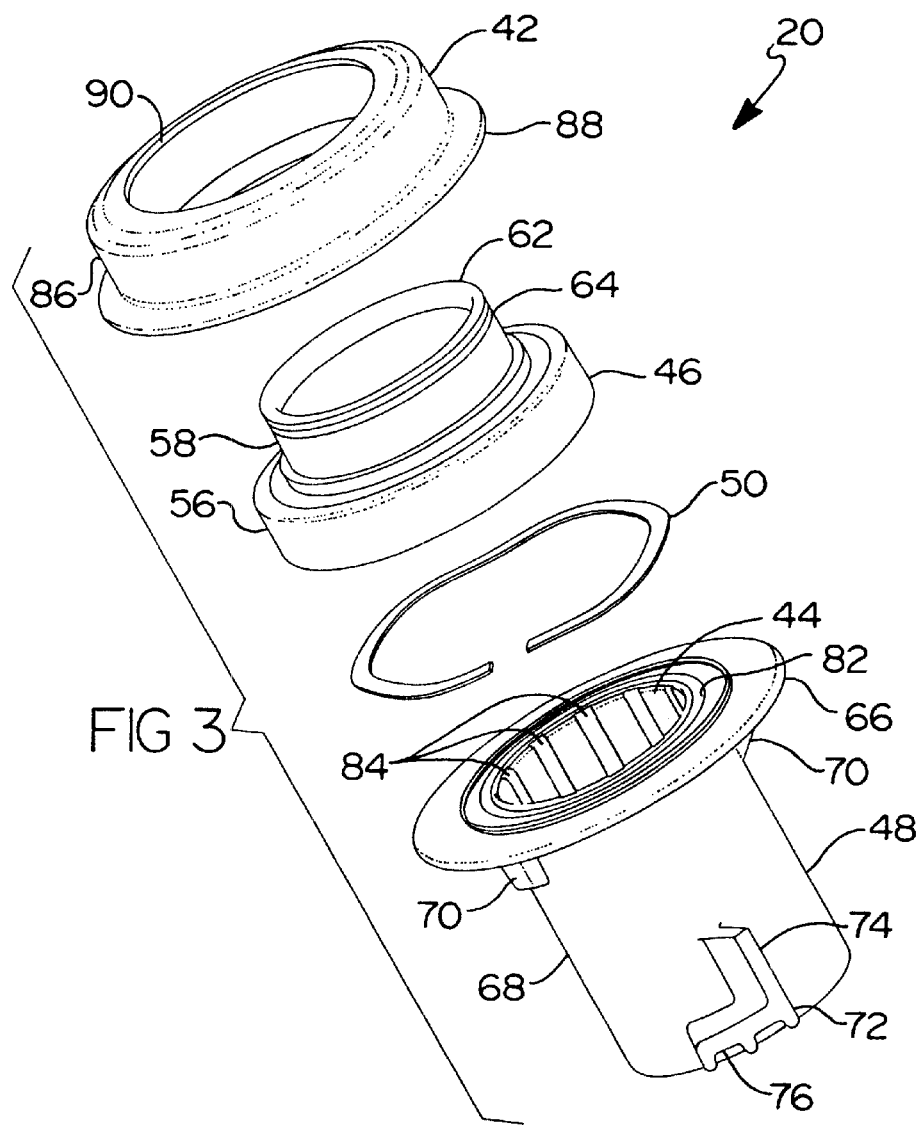

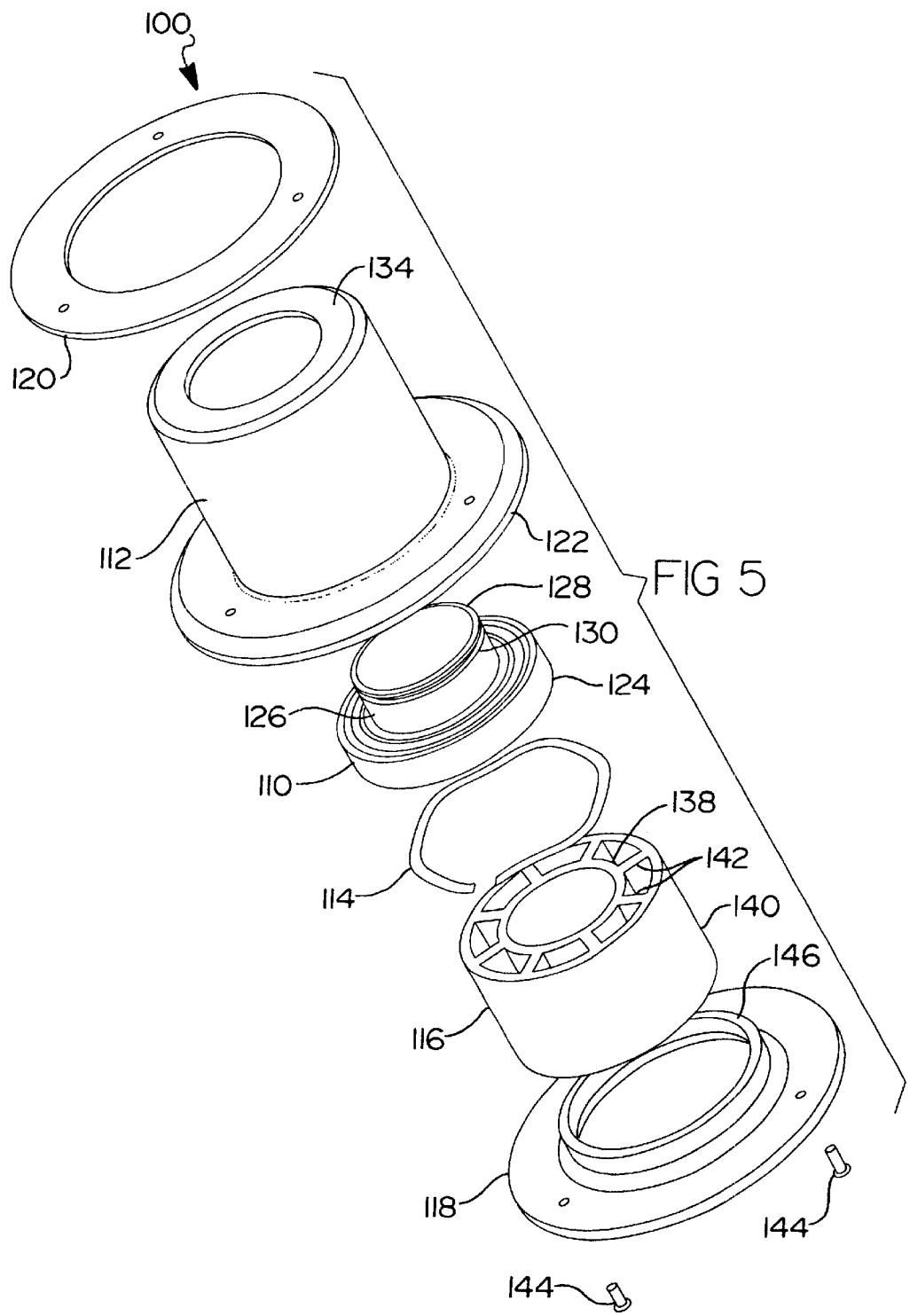

RELEASE ASSEMBLY FOR USE WITH A FRICTION CLUTCH

FIELD OF THE INVENTION

This invention relates to release assemblies for use with clutches for manual transmissions, and particularly release assemblies for medium and heavy duty trucks.

BACKGROUND OF THE INVENTION

Pull type friction clutches for medium and heavy duty trucks commonly have a release assembly with a bearing housing with a square lower portion and a release fork with machined tines. The release assembly is concentric with and circumscribes the transmission input shaft. The release assembly is axially displaced by a clutch yoke or fork in the course of disengaging and re-engaging the clutch. The yoke acts against the bearing housing to displace the bearing and release the clutch. As the release force is diminished, the spring force of the clutch acts against the yoke, through the bearing housing, to restore the yoke and the associated shift linkage to the engaged position. The machined tines engage the square lower portion of the housing, thereby preventing rotation of the housing about the transmission input shaft. Preventing rotation of the housing is necessary to ensure that the tips of the yoke engage the contact pads on the housing. The contact pads are fixed to lugs extending from the sides of the housing. The contact pads are formed of a suitable wearable material which sustains relative motion of the yoke tips without damaging the yoke tips. After a period of use, the release assembly is removed and replaced. A reason commonly necessitating the removal and replacement of the release assembly is the wearing of the contact pads.

Customer expectations of increasingly longer periods of service-free operation require improvement of the yoke to release assembly interface durability. It is also desired to eliminate the need to provide a machined interface between the yoke and the release assembly to prevent rotation of the bearing housing. While U.S. Pat. No. 5,911,296, assigned to the assignee of the present invention, discloses one approach to improving the yoke to release assembly interface durability, it does not teach how to prevent the rotation of the bearing housing without employing a machined yoke to release assembly interface.

SUMMARY OF THE INVENTION

The present invention discloses a release assembly restricting rotation of a housing of the release assembly without requiring the provision of machined surfaces on either the yoke or the release assembly.

The present invention also discloses a release assembly providing improved durability at the yoke to release assembly interface.

A clutch release assembly for use in a motor vehicle includes a bearing having an inner race and an outer race and having a release sleeve formed integral with the inner race and having an axis of rotation around which the outer race rotates relative to the inner race. A cover formed of metal receives at least in part the bearing assembly. The cover has a radially inwardly extending flange partially closing a first end. The cover has an open second end. The radially inwardly extending flange has an inner diameter sized to permit the release sleeve to pass therethrough and to prevent the bearing from passing therethrough. A housing is fixed to the second end of the cover. The housing, together with the cover, defines a cylindrical cavity therein centered on the axis of rotation. The bearing is disposed within the cylindrical cavity and is oriented to have its release sleeve extending past the radially inwardly extending flange. The housing is formed of metal. A low friction bushing is fixedly disposed within the cylindrical cavity and has an inside diameter smaller than an inside diameter of the inner race. A spring is axially disposed between the bushing and the bearing assembly. The spring is sized to engage the outer race and biases the outer race against the cover. Two L-shaped lugs are formed on opposite sides of one of the cover and the housing and extend radially therefrom. The lugs each define a circumferential engagement surface in a plane normal to the axis and face toward the bearing. An axially extending engagement surface is normal to the circumferential engagement surface wherein the tips of the arms of a clutch yoke engage the circumferential engagement surface to axially displace the release assembly. The axially extending surfaces prevent rotation of the housing by engagement with the tips of the arms.

BRIEF DESCRIPTION OF THE DRAWINGS

FIG. 3 is an exploded perspective view of the release assembly of FIG. 2.

FIG. 5 is an exploded perspective view of a third embodiment of a release assembly.

DESCRIPTION OF PREFERRED EMBODIMENTS

Figure 1:
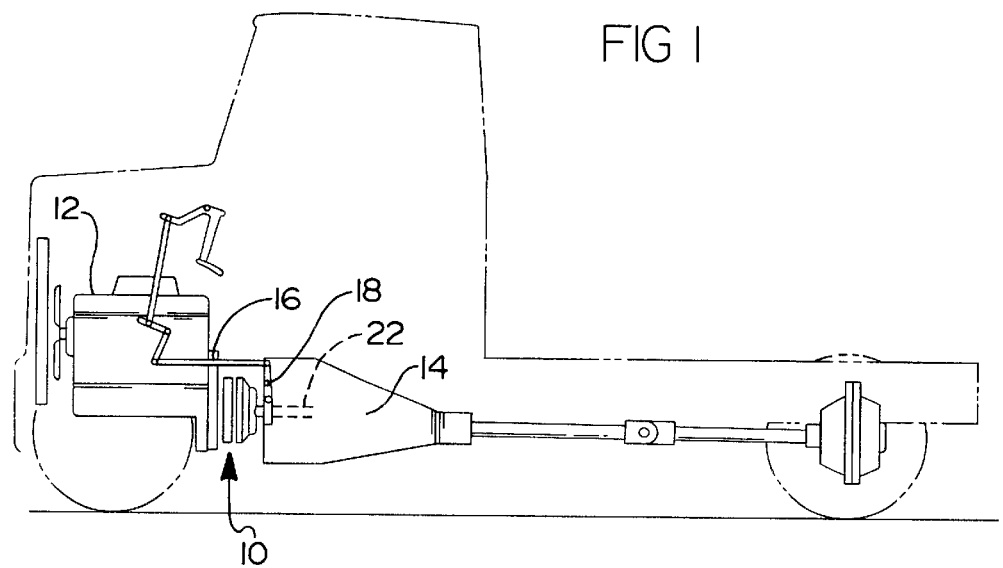
FIG. 1 is a side view of a drive train, including an engine, a transmission and an axle in their relative vehicle locations.

A frictional drive or clutch 10 is disposed between an engine 12 and a transmission 14. Clutch 10 rotates about an axis of rotation 15. A clutch linkage 16 is used by a vehicle operator to selectively disengage and re-engage clutch 10. A clutch yoke 18, comprising part of the clutch linkage and alternatively referred to as a clutch fork, is at an end of the clutch linkage 16. Yoke 18 engages a release assembly 20 of clutch 10. Release assembly 20 is slidably and rotatably disposed over input shaft 22 of transmission 14. Release assembly rides on a stationary sleeve or quill 23 extending from transmission 14. Quill 23 is radially disposed between input shaft 22 and release assembly 20. Although as shown, quill 23 is stationary, extending from the transmission housing bearing cover, release assembly 20 could alternatively be employed in combination with a dynamic quill which rotates with the input shaft, or with no quill at all.

Clutch 10 also includes a flywheel 24 rotatably coupled to the crank shaft 25 of engine 12 for unitary rotation therewith. A driven disc 26 is slidably disposed over the splines of input shaft 22 for unitary rotation therewith. Driven disc 26 is axially disposed between flywheel 24 and a pressure plate 28. A clutch cover 30 is mounted directly to flywheel 24 and substantially encloses pressure plate 28. Cover 30 can be cast or stamped. A diaphragm spring 32 disposed between pressure plate 28 and cover 30 biases pressure plate 28 toward flywheel 24, compressing driven disc 26 between pressure plate 28 and flywheel 24, and causing input shaft 22 to rotate as a unit with flywheel 24 and pressure plate 28. Diaphragm spring 32 has fingers 34 which extend radially inwardly from an outer annular portion 36. Tips of fingers 34 are engaged by a retainer 38 disposed at an end of release assembly 20. Retainer 38 is kept in engagement with release assembly by a snap ring 39. Annular portion 36 engages cover 30 at an outer diameter, and engages pressure plate 28 at an inner diameter. An anti-rotation strap 40 connects pressure plate 28 with cover 30, rotatively fixing pressure plate 28 to flywheel 14 and cover 30, while allowing relative axial motion between pressure plate 28 and cover 30.

Figure 2:
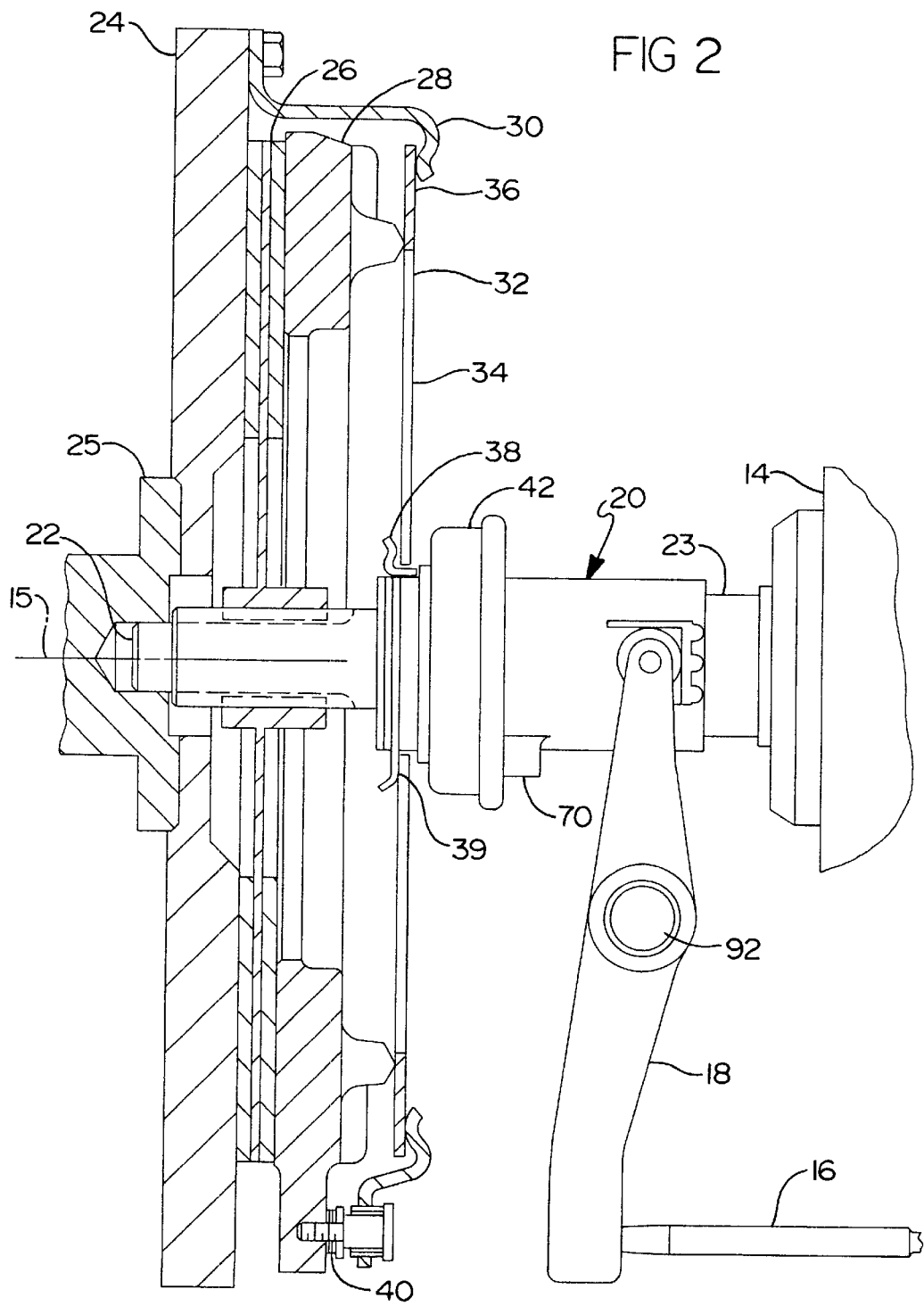
FIG. 2 is a sectional view of a clutch assembly including a first embodiment of a release assembly.

While a diaphragm type clutch is shown in FIG. 2, it is to be appreciated that a lever type arrangement could alternatively be employed. Lever type clutches are well known. In an exemplary lever type clutch (not shown) a plurality of pressure springs is disposed between a retainer disposed at an end of release assembly 20 and cover 30. A plurality of levers, six in one embodiment, radiate outwardly from the retainer. The radially inwardly disposed tips of the levers engage the retainer. The levers in turn pivot on their radially outwardly disposed ends on a fulcrum provided on the cover. An intermediate point on the levers engages pressure plate 28. The pressure springs are oriented to force the retainer and the tips of levers away from the cover, and thereby bias pressure plate 28 toward flywheel 24 and engaging driven disc 26.

A hub of driven disc 26 has internal splines slidably disposed over external splines of input shaft 22. A plate having friction material disposed on both sides thereof is rotatably connected to the hub. Commonly, damping springs are disposed between the hub and the plate.

A first embodiment of release assembly 20 includes a bearing cover 42, a bushing 44, a ball bearing 46, a bearing housing 48 and a pre-load/anti-rotation spring 50. Yoke 18 has two arms 52 in engagement with release assembly 20. Rollers 54, disposed on an inboard side and at an end of each arm, engage bearing housing 48.

Bearing 46 is preferably a ball bearing so as to be able to sustain thrust loads. Bearing 46 is also preferably sealed to prevent or at least minimize the risk of potentially damaging debris entering the bearing and damaging the rollers, and/or the bearing races. Bearing 46 includes an outer race 56 and an inner race 58. Ball shaped rollers are disposed between outer race 56 and inner race 58. Outer race 56 is intended to be non-rotating relative to bearing housing 48. Inner race 58 is formed integral with a release sleeve portion 62. Release sleeve portion 62 extends axially from bearing 46 and defines an end of release assembly 20. Release sleeve portion 62 has a snap ring groove 64 proximate to an end thereof.

Bearing housing 48 has an end plate portion 66 disposed at a first end of a cylindrical bushing carrier portion 68 of housing 48. End plate portion 66 is substantially flat and annular in shape as shown in the FIG. 3. Bushing carrier portion 68 is formed integral and unitary with end plate portion 66. Bearing housing 48 is cast of steel, and heat treated. Housing 48 is not machined. One or more gussets 70 extend between end plate portion 66 and bushing carrier portion 68 to stiffen end plate portion 66. Housing 48 has a pair of L-shaped anti-rotation lugs 72 formed on opposite sides of bushing carrier portion 68. Lugs 72 are formed integral and unitary with carrier portion 68 as part of bearing housing 48. Anti-rotation lugs 72 each have an axially extending portion 74 and a circumferentially extending portion 76. Axially extending portion 74 and circumferentially extending portion 76 meet at a right angle. Circumferentially extending portion 76 is disposed at a second end of bushing carrier portion opposite the first end. There are a plurality of reinforcing ribs on a side of portions 76 facing the second end to help sustain the axial clutch release loads. Counterbores are provided on each end of housing 48 to help retain bushing 44.

Bushing 44 is formed of a low friction material such as polytetra fluoroethylene (PTFE). Bushing 44 extends the full length of housing 48, and is formed within the inner diameter cavity 82 of housing 48 by insert molding it in the inner diameter cavity. The insert molding eliminates any need to machine the internal diameter of housing 48. Axial retention of bushing 44 in housing 48 is ensured by forcing some of the plastic into the space provided by the counterbores at the ends of housing 48. Bushing 44 is provided with a plurality of axially extending debris channels 84. The inside diameter of bushing 44 is sized to slide freely over quill 23.

Bearing cover 42 is stamped of steel. Cover 42 has an enclosure portion 86 in which substantially all of bearing 46 is disposed. Enclosure portion 86 has an inside diameter somewhat larger than an outside diameter of outer race 56 to facilitate receipt of race 56 by cover 42. At a first end of bearing cover 42 and of enclosure portion 86, an outer diameter lip 88 extends axially away from enclosure portion 86 before cover 42 is attached to housing 48. Lip 88 is crimped over an outer diameter of plate portion 66 to fix cover 42 to housing 48. At a second end, a radially inwardly extending flange 90 extends across the sealed gap between outer race 56 and inner race 58 to provide bearing 46 with an additional element of protection from debris intrusion.

In an installed condition, release assembly 20 is positioned by yoke 18. Axially extending portions 74 of lugs 72 are located a distance above axis 15 equal to the radius of rollers 54. Thus, rollers 54 engage circumferentially extending portions 76 at locations defining a line passing through and normal to axis 15. Such an engagement location facilitates axial movement of the bearing without tending to tip or pivot release assembly 20 with respect to input shaft 22 and quill 23.

The axial movement of rollers 54 is achieved by the pivoting of yoke 18. Yoke 18 pivots about a shaft 92 retained within a clutch housing (not shown) which substantially surrounds clutch 10. An inboard side of rollers 54 limits lateral movement of release assembly 20 relative to input shaft 22. Pivot shaft 92 may be rotatively mounted to permit rotation relative to the clutch housing, or alternatively, if provision is made to enable rotation between shaft 92 and yoke 18, shaft 92 may be rotatively fixed to the clutch housing. It is to be appreciated that the pivoting motion of yoke 18 results in a slight offset of the location of a line between the centers of rollers 54 and axis 15 as rollers 54 move through their arcuate path. The length of arms 52 is chosen so that for the axial travel required, the resultant off-set is of minimal effect. However, it should be appreciated that as the friction material of driven disc 26 wears, release assembly 20 will be drawn closer to flywheel 24. With increased movement of release assembly 20 toward flywheel 24, yoke 18 pivots further from an upright position. The increased pivoting results in a larger gap between rollers 54 and the axially extending portion 74 of lugs 72. The gap permits pivoting rotation of release assembly 20 to produce contact between one of rollers 54 and a corresponding one of axially extending portions 74. The pivoting effectively doubles the size of the gap. The length of the circumferentially extending portions 76 must be sufficient so that in a worn disk condition, rollers 54 are able to maintain engagement with portions 76. An inadequate length may result in only one of portions 76 being engaged by yoke, with assembly 20 resultantly cocking and not sliding freely. Employing an adjusting mechanism which compensates for the wear of the friction elements of driven disc 26, such as that disclosed in U.S. Pat. No. 5,566,804, would reduce the range of yoke pivoting which would otherwise be required.

Pre-load/anti-rotation spring 50 is in the form of a wave spring. Pre-load/anti-rotation spring 50 biases outer race 56 into engagement with cover 42. The second end of cover 42 is configured so that when bearing 46 is pressed thereagainst, the outer race 56 engages the cover and the inner race 58 does not. This causes outer race 56 to resist rotation relative to cover 42 and housing 48.

In operation, the invention operates as a conventional release assembly in that it moves in an axial direction responsive to operator inputs to the linkage 16 releasing and re-engaging clutch 10. The force of the clutch apply spring, whether it be diaphragm spring 32 or pressure springs, resists the force applied against release assembly 20 by yoke 18. Travel and free play or lash of yoke 18 in an engaged or unloaded condition must be limited so that rollers 54 cannot move past the ends of axially extending portions 74 of lugs 72. Retainer 38 and inner race 58 will tend to rotate with pressure plate 28, diaphragm spring 32 and cover 30. Housing 48 and cover 42 will be prevented from rotation because of engagement of at least one axially extending portion 74 with yoke, and outer race 56 will resist rotation relative to housing 48.

Figure 4:
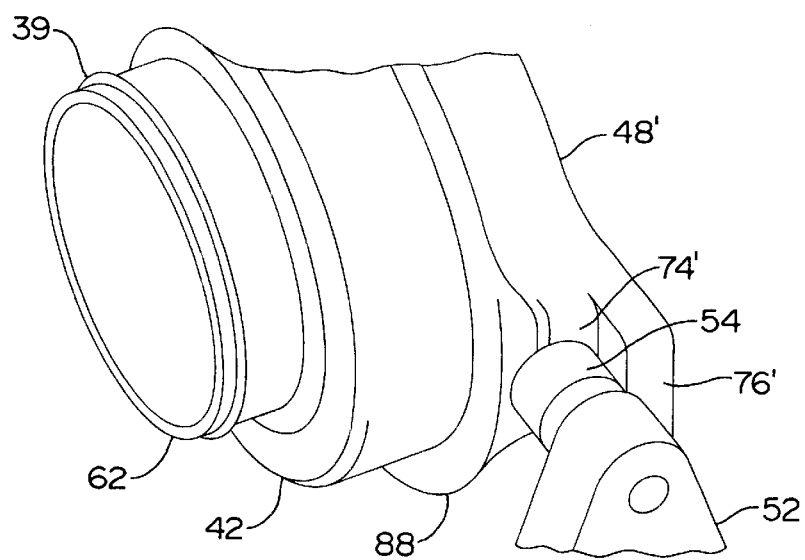
FIG. 4 is partial perspective side view of a second embodiment of a release assembly.

An alternative to axially extending portion 74 for preventing rotation of housing 48' is shown in FIG. 4. Flats 74' normal to a line between rollers 54 and located adjacent the engagement surfaces of circumferentially extending portion 76', and are located only a short distance from the inboard ends of rollers 54. Flats 74' are so close to rollers 54 that they engage the ends of rollers 54 when housing 48' begins to rotate.

Figure 6:
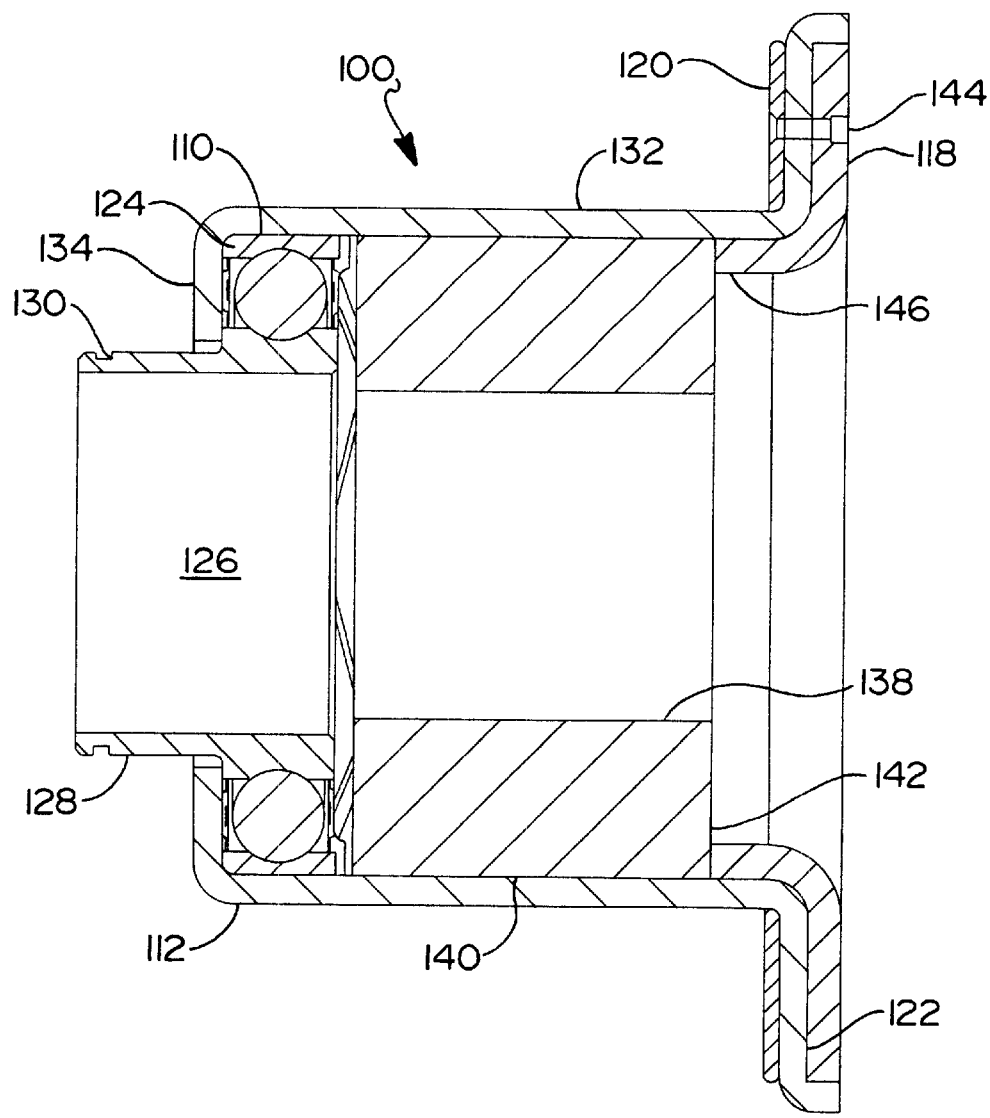
FIG. 6 is a sectional side view the embodiment of FIG. 5.

FIGS. 5 and 6 show an alternative configuration for a bearing eliminating the need for a machined fork and bearing interface. Release assembly 100 includes a bearing 110. A housing 112, similar to cover 42 but longer, receives bearing 110. A wave spring 114 and a plastic bushing 116 are also received by housing 110. The contents of housing 112 are retained therein by a retaining collar 118. A wear ring 120 is fixed to a radially outwardly extending thrust ring 122 of housing 112.

Bearing 110 is substantially like bearing 46, having an outer race 124, an inner race 126 and a plurality of balls disposed therebetween. Bearing 46 also has an axially extending sleeve portion 128 formed integral with the inner race. Sleeve portion 128 similarly has a snap ring groove 130.

Housing 112 comprises in its largest part a cylindrical portion 132. At a first end of housing 112 there is a radially inwardly extending flange 134. At a second end of housing 112, there is a radially outwardly extending annular thrust ring 122. Housing 112, including flange 134 and ring 122, is stamped from a single piece of steel as a single unit.

Bushing 116 is also preferably formed from a low friction plastic such as polytetra fluoroethylene (PTFE). It should be appreciated that alternative materials, including metals such as bronze, may be used for the bushings. The exemplary embodiment has an inner wall 138 and an outer wall connected by a plurality of connecting spokes 142. The outer diameter of bushing 116 and the outer diameter of outer race 124 are approximately the same, permitting cylindrical portion 132 to be of a constant diameter.

Wave spring 114 is disposed between bushing 116 and bearing 110. Wave spring 114 biases the outer race 124 against flange 134, causing outer race 124 to resist rotating relative to housing 112.

Retaining collar 118 holds bearing 110, wave spring 114 and bushing 116 inside housing 112. Retaining collar 118 is fixed against thrust ring 122 by three small rivets 144 on the second end of housing 112. An axially extending engagement portion 146 of retaining collar 118 extends axially into the cavity of cylindrical portion 132 and contacts an end of bushing 116. With retaining collar 118 fixed to housing 112, engagement portion 114 acts against bushing 116 to compress wave spring 114.

Wear ring 120 is affixed to a side of thrust ring 122 opposite retaining collar 118 by the same rivets 144 used to fix retaining collar 118 to thrust ring 122. The material of which wear ring 120 is made depends on the design of the yoke 18 engaging wear ring 120. If yoke 18 employs rollers, a hardened material would be most appropriate for wear ring. If a sliding contact between wear ring 120 and the tips of arms without rollers is anticipated, then friction material would be most appropriate for use as wear ring 120.

In operation, thrust ring 122 is engaged by yoke rollers 54. Force between rollers 54 and thrust ring 122 causes housing 112 to resist rotation induced by the rotation of inner race. Rotational indexing of housing 112 occurs with clutch 10 in an engaged condition when the loads between yoke 18 and release assembly 20 are lowest. The indexing of housing 112 result in rollers 54 contacting wear ring 120 in different spots around wear ring 120 for each release of the clutch. Use of a yoke without rollers would be benefitted as well by release assembly 100. As noted above, wear ring would be formed of frictional material. The regular indexing of housing 112 results in wear being distributed around wear ring 120. The distribution of wear means that a wear ring 120, and release assembly 20 can be used much longer than a convention release assembly having relatively small friction pads. Of course wear ring 120, and supporting thrust ring 122 must be sufficiently large to accommodate the change in position of rollers 54 relative to axis 15 with the pivoting of yoke 18. As noted above, the change in position becomes more pronounce with the wear of the friction material on driven disc 24.

The embodiments disclosed herein have been discussed for the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

What is claimed is:

1. A clutch release assembly for use in a motor vehicle comprising:

a bearing having an inner race and an outer race and having a release sleeve formed integral with the inner race and having an axis of rotation around which the outer race rotates relative to the inner race;

a cover formed of metal receiving at least in part the bearing having a radially inwardly extending flange partially closing a first end and having an open second end wherein the radially inwardly extending flange has an inner diameter sized to permit the release sleeve to pass therethrough and to prevent the bearing from passing therethrough;

a housing fixed to the second end of the cover and together with the cover defining a cylindrical cavity therein centered on the axis of rotation wherein the bearing is disposed within the cylindrical cavity and is oriented to have its release sleeve extending past the radially inwardly extending flange, the housing being formed of metal;

a low friction bushing fixedly disposed within the cylindrical cavity and having an inside diameter smaller than an inside diameter of the inner race;

a spring axially disposed between the bushing and the bearing, the spring sized to engage the outer race and biasing the outer race against the cover;

two L-shaped lugs formed on opposite sides of one of the cover and the housing and extending radially therefrom, the lugs each defining a circumferential engagement surface in a plane normal to the axis and facing toward the bearing and an axially extending engagement surface normal to the circumferential engagement surface wherein tips of the arms of a clutch yoke would engage the circumferential engagement surface to axially displace the release assembly and further wherein the axially extending surfaces prevent rotation of the housing by engagement with the tips of the arms.

2. A clutch release assembly as claimed in claim 1 wherein the housing and the lugs are integrally formed as a steel casting.

3. A clutch release assembly as claimed in claim 2 wherein the cover is stamped of steel.

4. A clutch release assembly as claimed in claim 3 wherein the cover is joined to the housing by crimping a radially outwardly extending lip of cover over a radially outwardly extending end plate portion of the housing.

5. A clutch release assembly for use in a motor vehicle comprising:

a bearing having an inner race and an outer race and having a release sleeve formed integral with the inner race and having an axis of rotation around which the outer race rotates relative to the inner race;

a cover formed of metal receiving at least in part the bearing having a radially inwardly extending flange partially closing a first end and having an open second end wherein the radially inwardly extending flange has an inner diameter sized to permit the release sleeve to pass therethrough and to prevent the bearing from passing therethrough;

a housing fixed to the second end of the cover and together with the cover defining a cylindrical cavity therein centered on the axis of rotation wherein the bearing is disposed within the cylindrical cavity and is oriented to have its release sleeve extending past the radially inwardly extending flange, the housing being formed of metal;

a low friction bushing fixedly disposed within the cylindrical cavity and having an inside diameter smaller than an inside diameter of the inner race;

a spring axially disposed between the bushing and the bearing, the spring sized to engage the outer race and biasing the outer race against the cover;

two engagement lugs formed on opposite sides of one of the cover and the housing and extending radially therefrom, the lugs each defining a circumferential engagement surface in a plane normal to the axis and facing toward the bearing and an axially extending engagement surface normal to the circumferential engagement surface wherein tips of the arms of a clutch yoke would engage the circumferential engagement surface to axially displace the release assembly and further wherein the axially extending surfaces prevent rotation of the housing by engagement with the inboard tips of the arms.

* * * * *